United States Patent [19]
Botnick

[11] 3,752,191
[45] Aug. 14, 1973

[54] PUSH BUTTON MIXING VALVE

[76] Inventor: Irlin Botnick, 3155 Kersdale Rd., Pepper Pike, Ohio 44124

[22] Filed: Apr. 20, 1972

[21] Appl. No.: 246,072

Related U.S. Application Data

[62] Division of Ser. No. 782,798, Dec. 9, 1968, Pat. No. 3,658,094.

[52] U.S. Cl. .............................. 137/636.1, 137/607
[51] Int. Cl. ............................................. F16k 11/10
[58] Field of Search .................... 137/636.1, 636.4, 137/625.4, 625.17, 607; 251/251, 257, 259

[56] References Cited
UNITED STATES PATENTS
3,128,635   4/1964   Doolittle .................... 137/636.1 X
FOREIGN PATENTS OR APPLICATIONS
691,670   5/1953   Great Britain .................. 137/636.1

*Primary Examiner*—Henry T. Klinksiek
*Attorney*—Philip D. Golrick

[57] ABSTRACT

A push-button multi-temperature selection valve, having at least two parallel chamber bores and hot and cold water supply connections communicating variously through radial ports with the chambers, has valve members for the respective ports radially slideable in support sleeve structures, each inserted endwise as a sub-assembly in a bore; and within each bore at least one coaxially-stemmed either rotary or sliding camming type valve operator. Two operators, selecting flow solely from respective inlets, and at least one selecting mixing flow from both inlets are actuated by respective push-button mechanisms.

11 Claims, 32 Drawing Figures

Patented Aug. 14, 1973

INVENTOR.
BY IRLIN BOTNICK

Ely and Golrick
ATTORNEYS

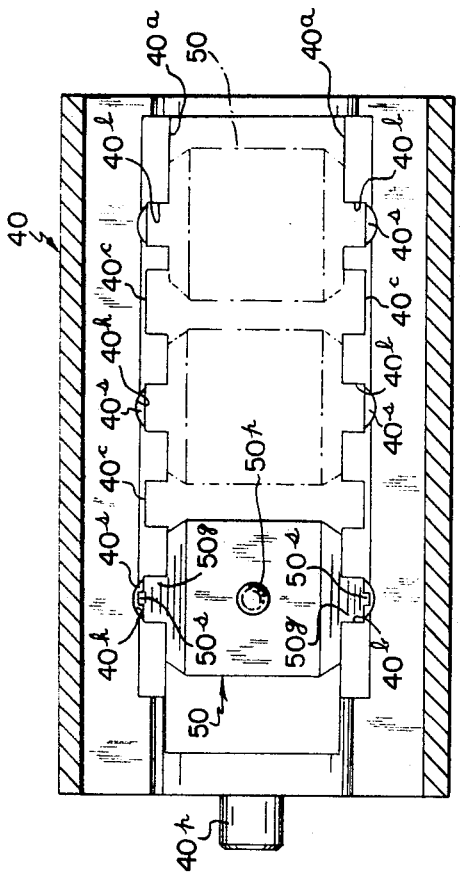
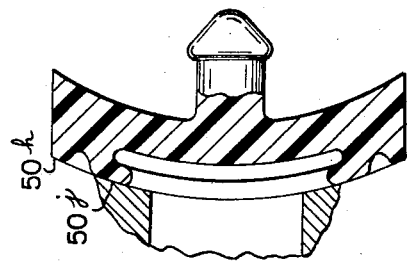
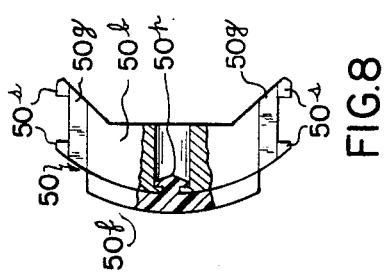
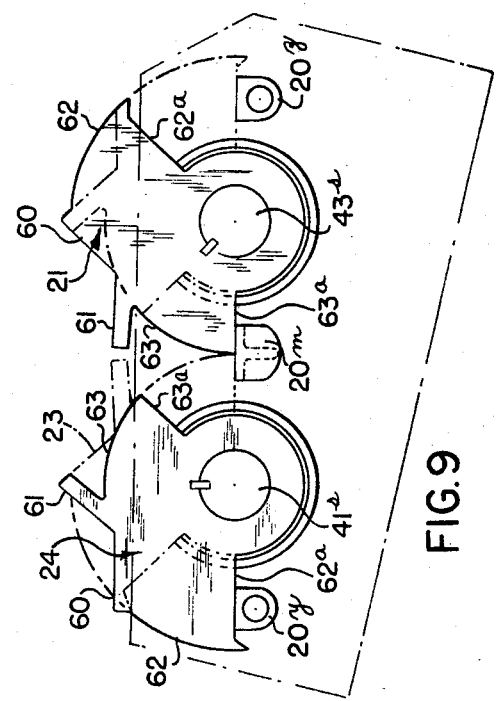
INVENTOR.
IRLIN BOTNICK
BY
*Ely and Golrick*
ATTORNEYS

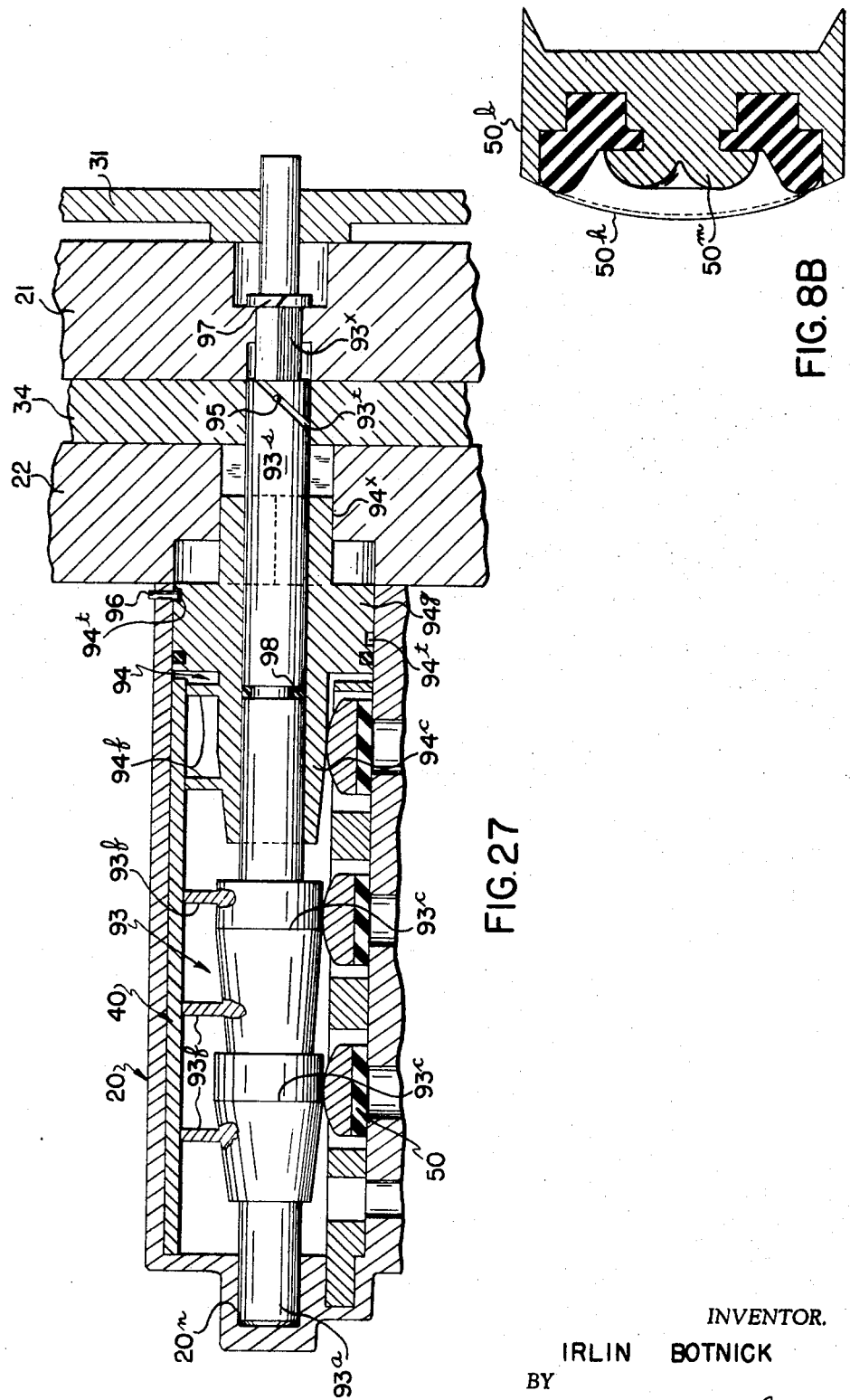

INVENTOR
IRLIN BOTNICK
BY
Ely and Golrick
ATTORNEYS

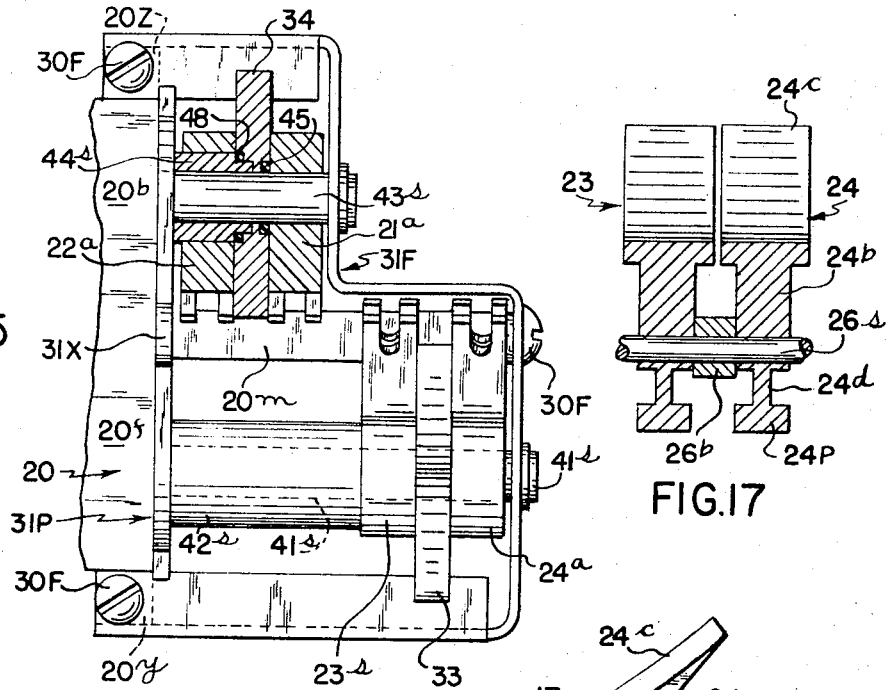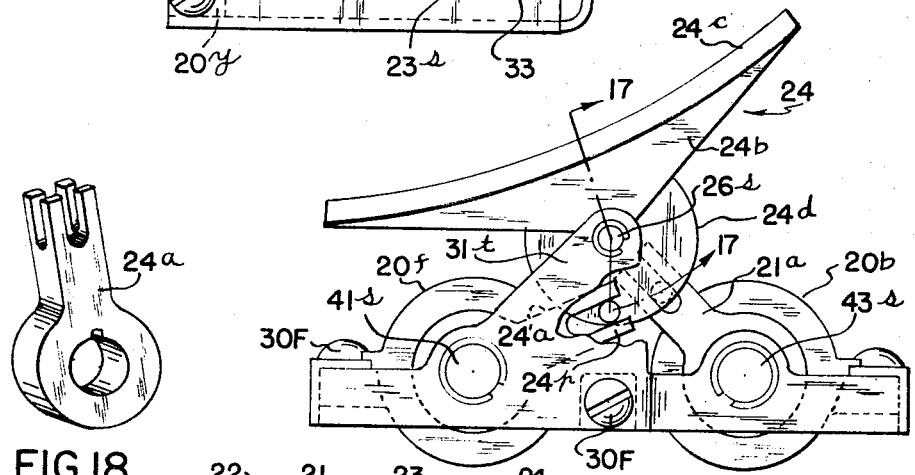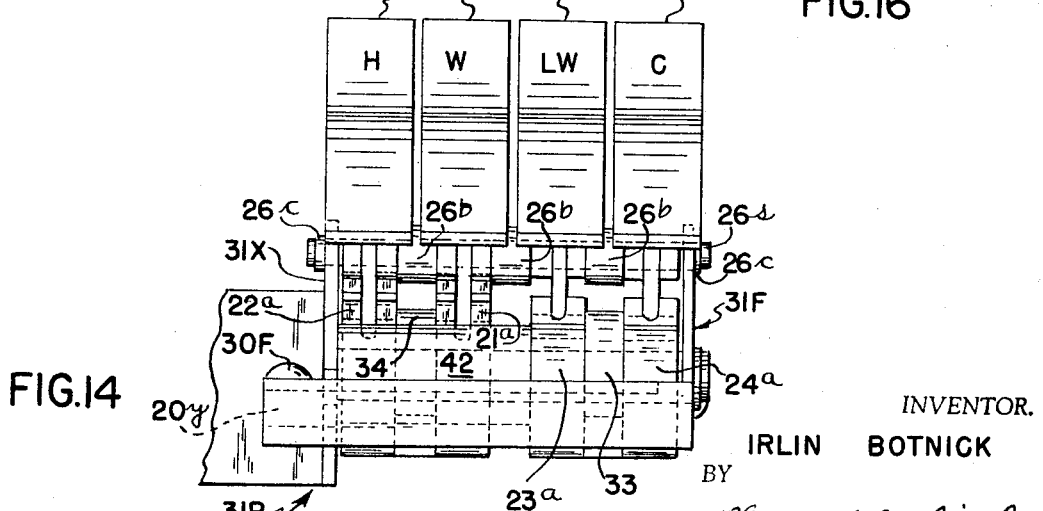

Patented Aug. 14, 1973

INVENTOR.
IRLIN BOTNICK
BY
Ely and Golrick
ATTORNEYS

INVENTOR.
IRLIN BOTNICK
BY
ATTORNEYS

Patented Aug. 14, 1973

INVENTOR.
IRLIN BOTNICK
BY
Ely and Golrick
ATTORNEYS

PUSH BUTTON MIXING VALVE

This application is a division of application Ser. No. 782,798, filed Dec. 9, 1968, now U. S. Pat. No. 3,658,094, granted Apr. 25, 1972.

It is the general object of the invention to provide a multi-temperature selecting push-button mixing valve of durable, relatively simple and low cost construction which though obviously having other applications is particularly adapted for residential use, for example on kitchen sinks, lavatories and bath tubs.

Another object is the provision of such a valve adapted for use of a simple easily removable decorative casing rendering the valve unit readily accessible e.g., from above a sink, for all operations of adjustment and maintenance servicing, such as setting elements establishing two temperatures intermediate between the supplied cold and hot water temperatures, shutting off the supply of water, cleaning the supply inlet filters, and also inspection or change of valve elements. Another object is the provision of such a valve for which a screw driver will be the only required servicing tool.

The aforegoing abstract outlines a particular aspect of the invention conducive to the attainment of the above advantageous objects. In the various embodiments, hereinafter more fully described, there is specifically disclosed, moreover, a novel combination of a supply filter on a temperature control element, with and without a shut-off device permitting at each inlet a shutting-off of the supply and/or easy removal and cleaning of the filter screen.

Further in various embodiments, valve supporting and operating assemblies are easily removed for inspection and repair by simple removal of end screws, with manual snap-in, snap-out manipulations being all that is entailed for replacement of individual valving elements in the assemblies and of valve sealing heads or elements on the individual valve members.

In the embodiments shown, a principal valve body casting requires a minimum of precision machining operations in consequence of the overall design while a majority of the other components may be readily fabricated at low cost by plastic molding techniques.

It is to be observed that certain sub-combinations of the overall valve herein disclosed apparently represent areas of novelty and advantageous construction useful as well for other applications and environments, possibly with other materials, namely the manner of operating individual valves for control of a respective port, and also sub-combinations useful, for example, for providing from supply lines of different water temperatures a discharge at the supply temperature of one and a second discharge at a selectably pre-set intermediate temperature.

Other objects and advantages will appear from the following description and the drawings wherein:

FIG. 7 is an enlarged longitudinal section of the valve member support taken approximately at line 7—7 in FIG. 6;

FIGS. 8, 8A and 8B are enlarged lateral detailed views of an individual valve member and a modification in section;

FIG. 9 is an outline end elevation of the push-buttons;

FIG. 14 is a fragmentary front elevation showing a modified push-button-to-stem connection with all four push-buttons in a side-by-side array;

FIG. 15 is a plan view, partially in section, of the FIG. 14 modification with the push-buttons removed;

FIG. 16 is a right end view of FIG. 14 with certain portions broken away;

FIG. 17 is an irregular section through a pair of push-buttons taken as indicated by the line 17—17 in FIG. 16;

FIG. 18 is a perspective detail view of a stem-to-push-button connecting lever;

Figure 1:
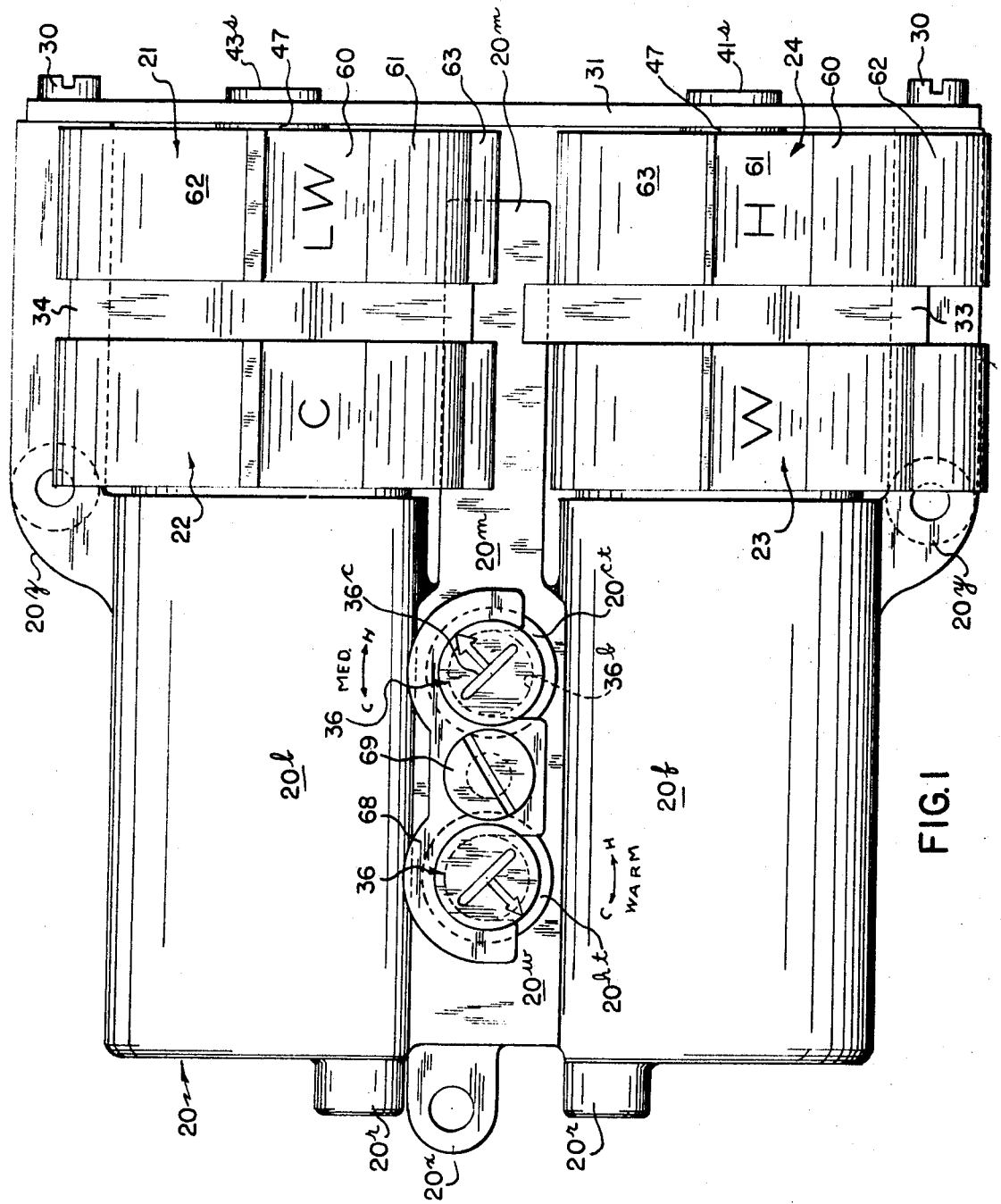
FIG. 1 is a top plan view of a push-button mixing valve assembly embodying the present invention with a decorative enclosing housing removed.
Figure 20:
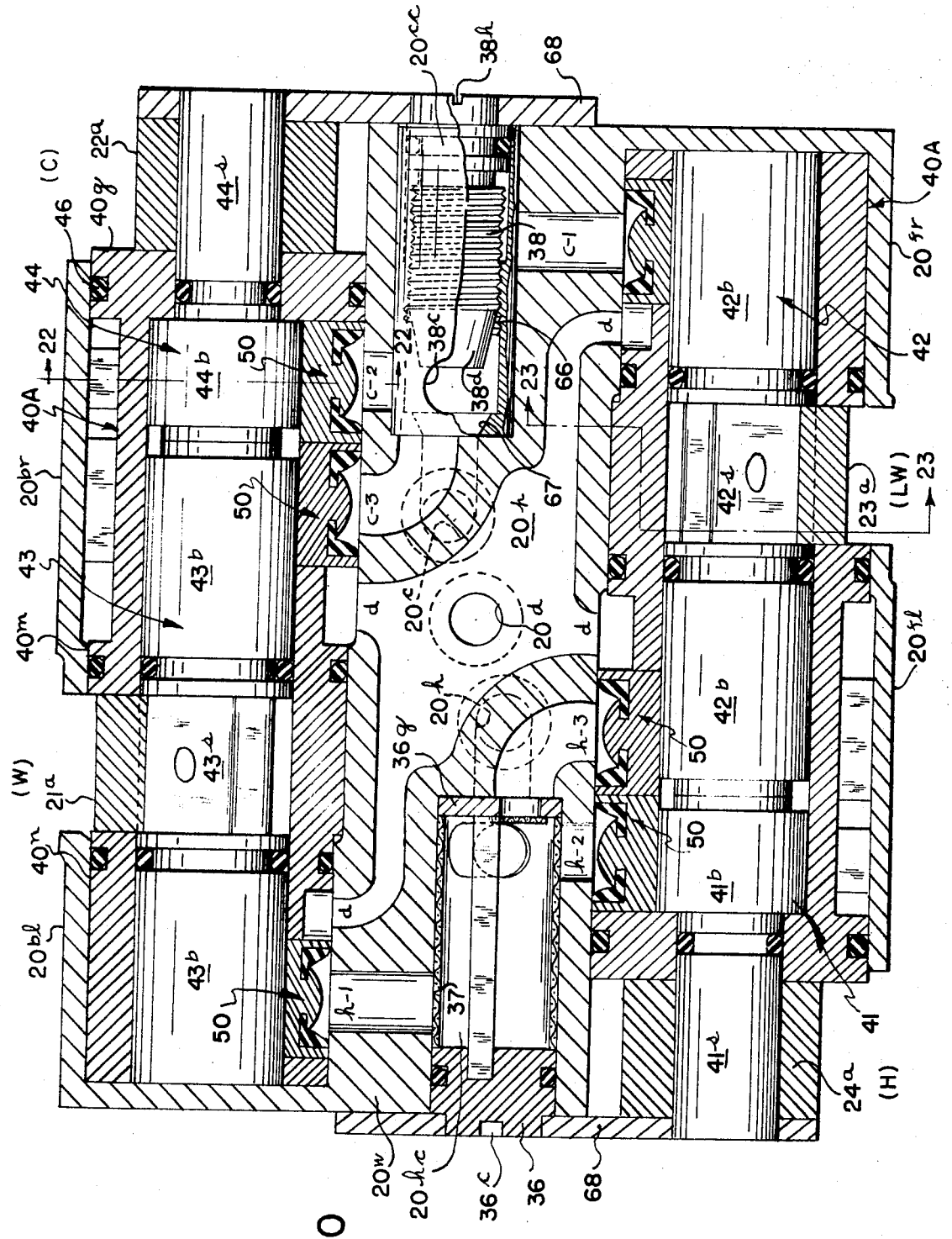
Figure 21:
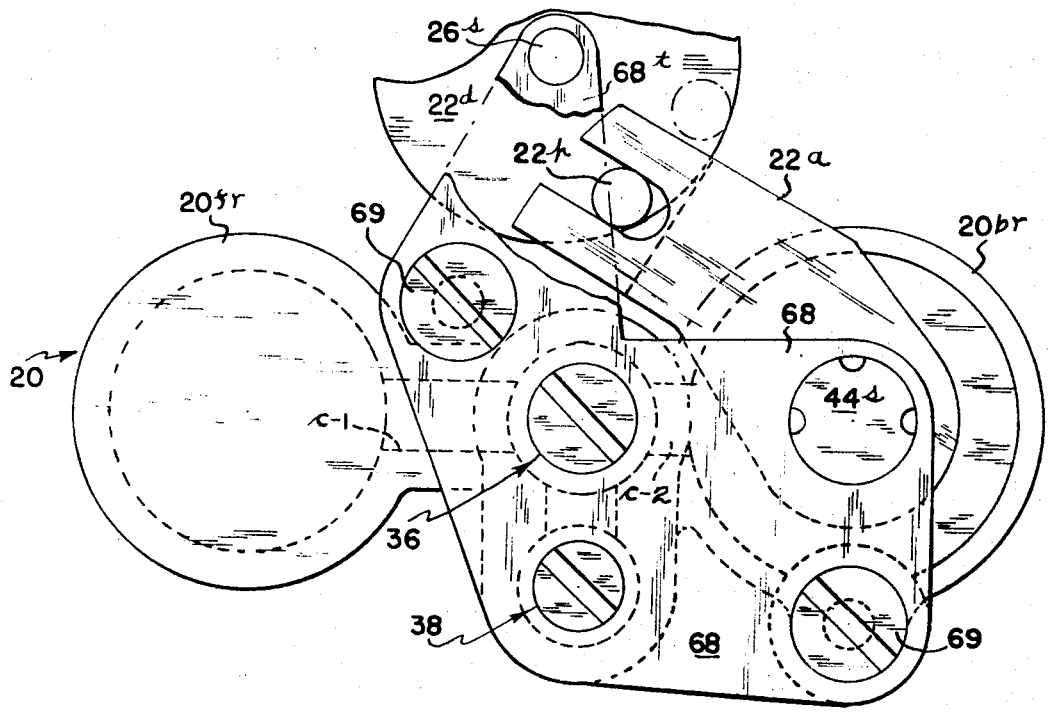
Figure 22:
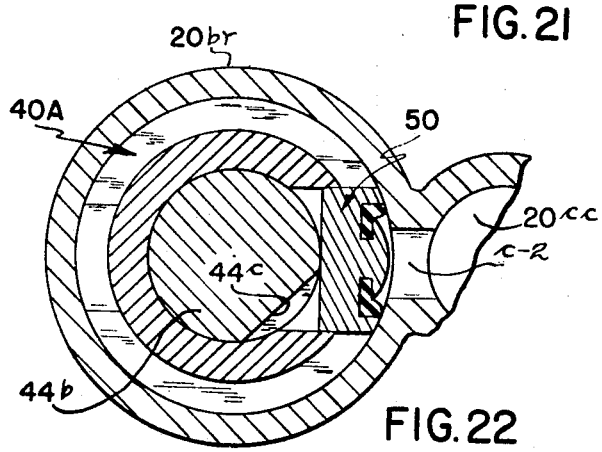
Figure 23:
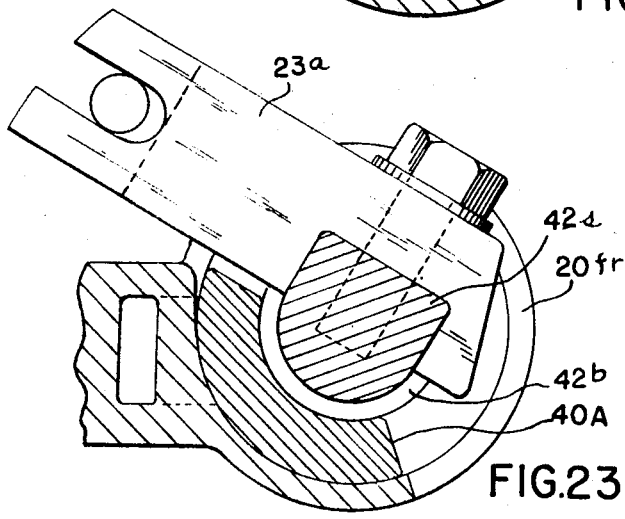
Figure 24:
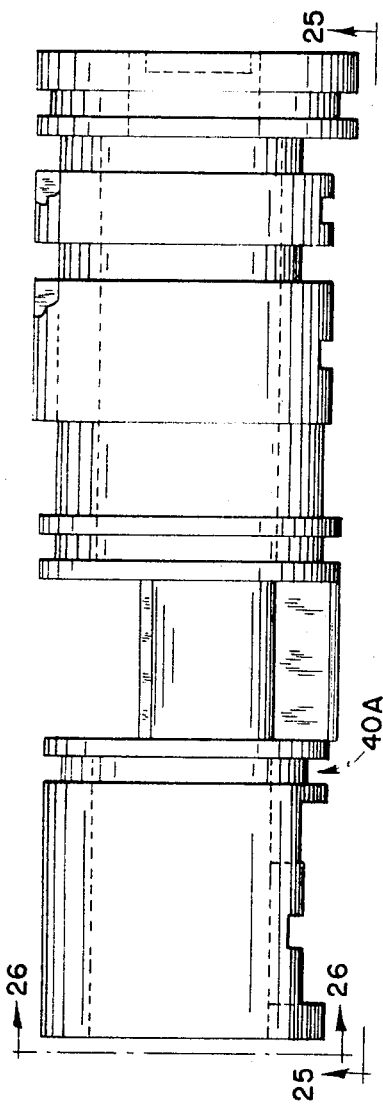
Figure 25:
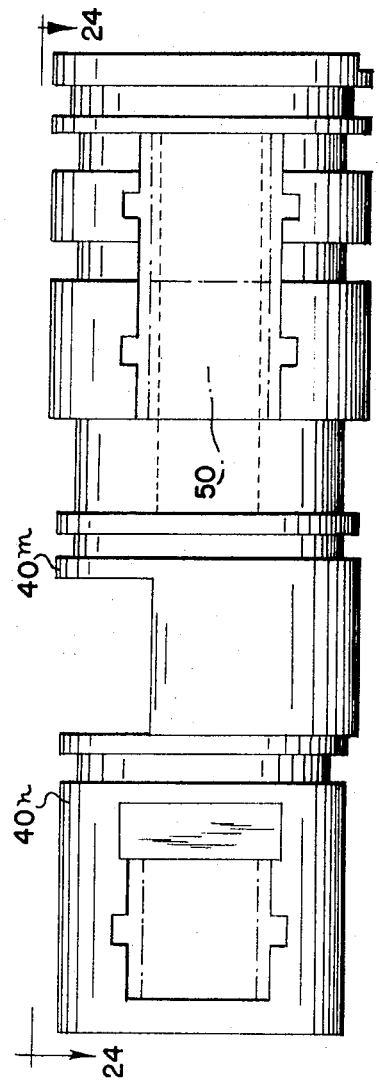
Figure 26:
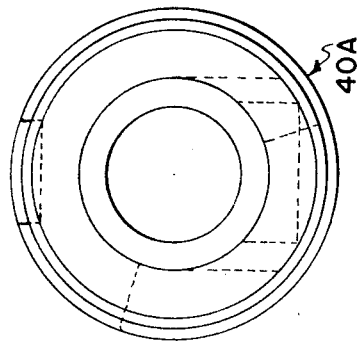
Figure 29:
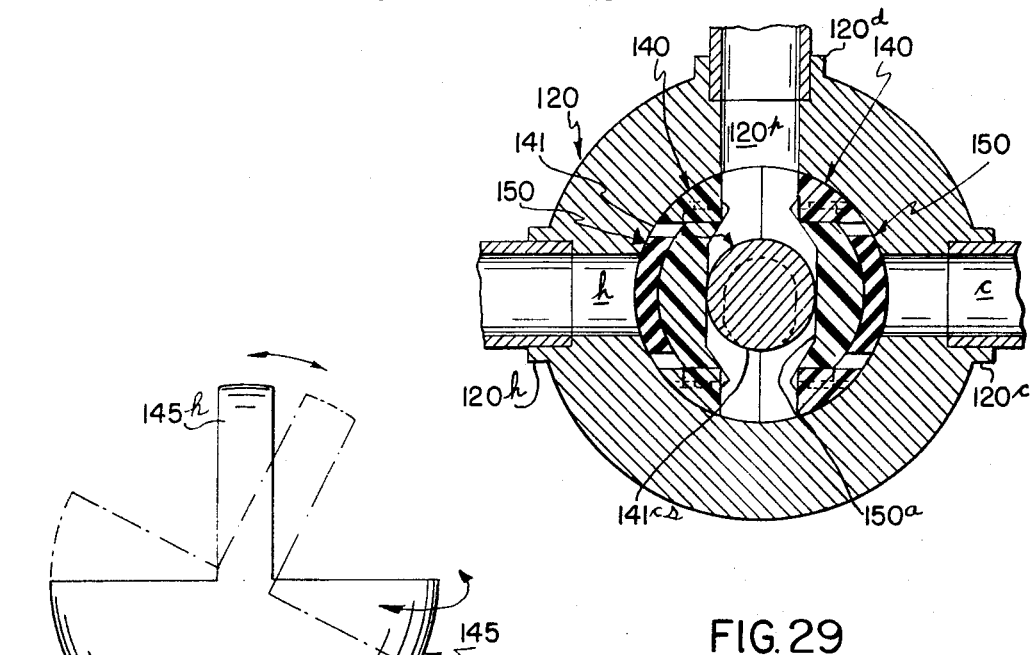
Figure 30:
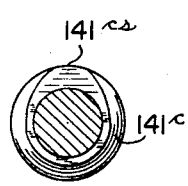
Figure 28:
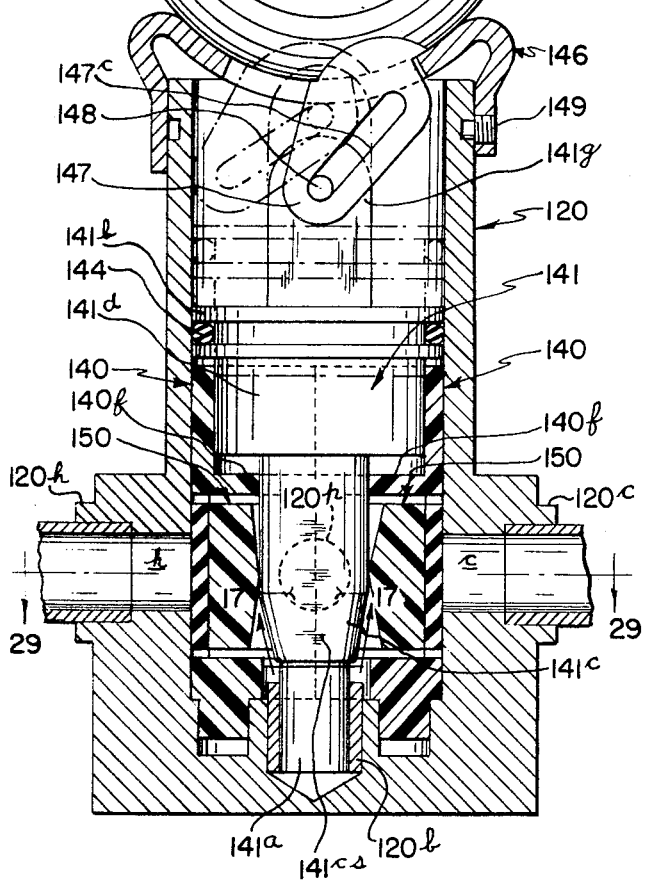

FIG. 20. is a substantially longitudinal section through a four-temperature valve with rotary operators as another modification, with certain parts omitted for clarity;

FIG. 21 is a fragmentary view of either end of FIG. 20;

FIGS. 22 and 23 are fragmentary sectional views taken substantially at 22—22 and 23—23 in FIG. 20;

FIGS. 24 and 25 are elevational views of a valve member supporting sleeve of the FIG. 20 modification, taken at 90° from each other;

FIG. 26 is a bottom end view corresponding to FIG. 24;

FIG. 27 is a fragmentary section representing a modification of FIG. 1 having axially sliding valve operators;

FIG. 28 is a vertical axial section of a further embodiment of the invention with a single operating element; and FIGS. 29 and 30 are transverse sections at lines 29—29 and 30—30 in FIG. 28.

FIRST ROTARY CAM VALVE FORM — FIGS. 1–9

Figure 3:
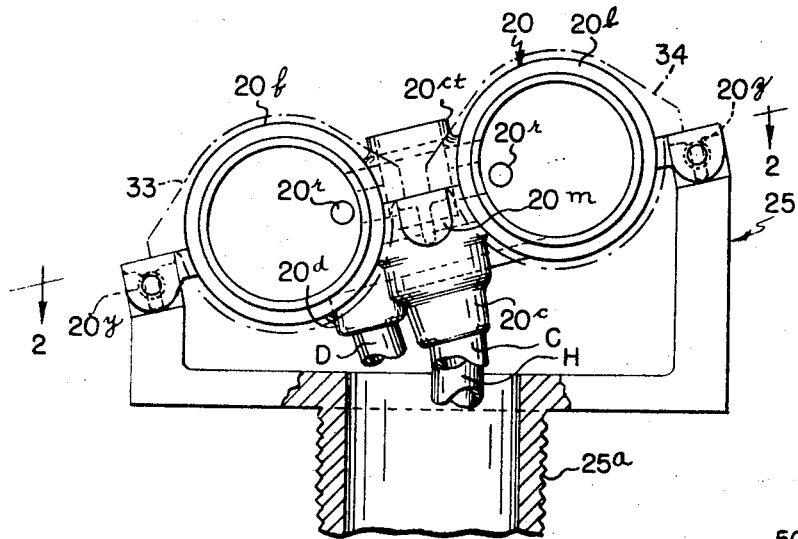
FIG. 3 is a right end view of the body casting, with the shape and position of one stem supporting member shown in dashed outline; and also showing a base fitting not appearing in other figures, for mounting the valve, for example, in a kithen sink environment with portions broken away.
Figure 4:
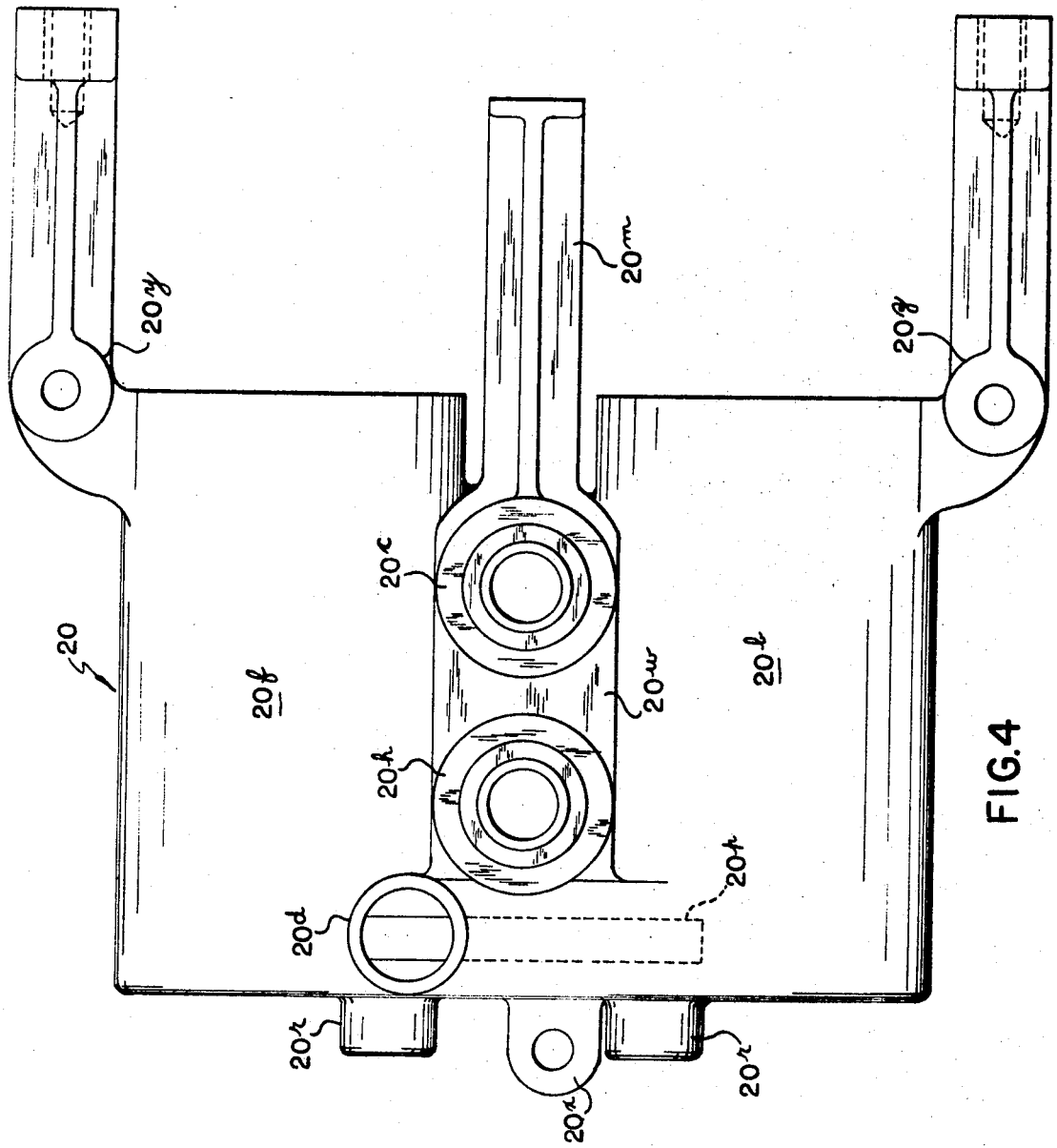
FIG. 4 is a bottom view of a body casting.

The basic invention is here first disclosed as embodied in a push-button valve unit (see FIG. 1) comprising a body casting 20, mounting at its right end with a set of four push-buttons 21, 22, 23, 24 for selection respectively of a luke warm water, cold water, warm water and hot water discharge; cam operated internal valving means hereinafter more fully described relative to FIG. 2; and suitable mounting bracket means, such as the sink top mounting bracket 25 shown in FIG. 3. The body casting 20, in a structure generally symmetrical about a vertical longitudinal center plane except as otherwise noted, includes two parallel tubular chambers 20f, 20b (front, back) with bores open at the right, joined by an intermediate wall portion 20w provided (see FIG. 4) with two like downward centered cylindrical bosses 20c, 20h and toward the left a further off-set cylindrical boss 20d, either suitably threaded or as shown reamed for sweated connection of piping for cold water supply C, hot water supply H, and valve discharge D, here shown (see FIG. 3) as flexible tubing bent and carried out downwardly through the hollow male threaded bracket stem 25a passed through a sink top, counter or the like and secured by a suitable nut for the mounting of the valve in the environment. The chambers or bore of 20f, 20b are connected by a large passage 20p through wall 20w to which the discharge outlet 20d opens.

The body casting at its left end and right end, top and bottom, respectively, is bolted, to corresponding respective upward integral arms of the bracket 25, through the three apertured integral lugs 20x,20y, 20z; the latter two lugs extending to the right as integral parallel spaced arms to the ends of which screws 30 secure a main retaining plate 31 serving as a pillow block supporting the outboard ends of an operator stem in each operator sub-assembly. Flat topped surfaces of the lug arms 20y, 20z and of an integral intermediate arm 20m are co-planar with the common plane of the axes of the two tubular body portions 20f, 20b (shown in dashed lines in elevation in FIG. 3) to support opposite ends of two like inner pillow blocks 33, 34 respectively supporting the outer ends of hollow stemmed operators in the two valve operating sub-assemblies.

Figure 5:
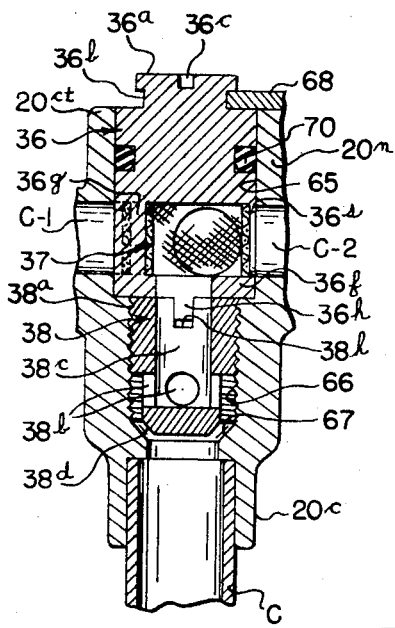
FIG. 5 is a fragmentary vertical sectional detail of one of two sub-assemblies for the supply inlets providing a temperature determining flow proportioning device, inlet filter and supply shut-off valve.

Vertical inlet bores through the intermediate or web wall (see FIGS. 1 and 3) from the supply inlet bosses 20c, 20h to corresponding upward bosses 20ct and 20ht on the top provide space for respective assemblies of a molded plastic proportioning valve adjusting plug element 36, filter screen 37 and a molded plastic supply shut-off plug device 38, (see FIG. 5).

Figure 2:
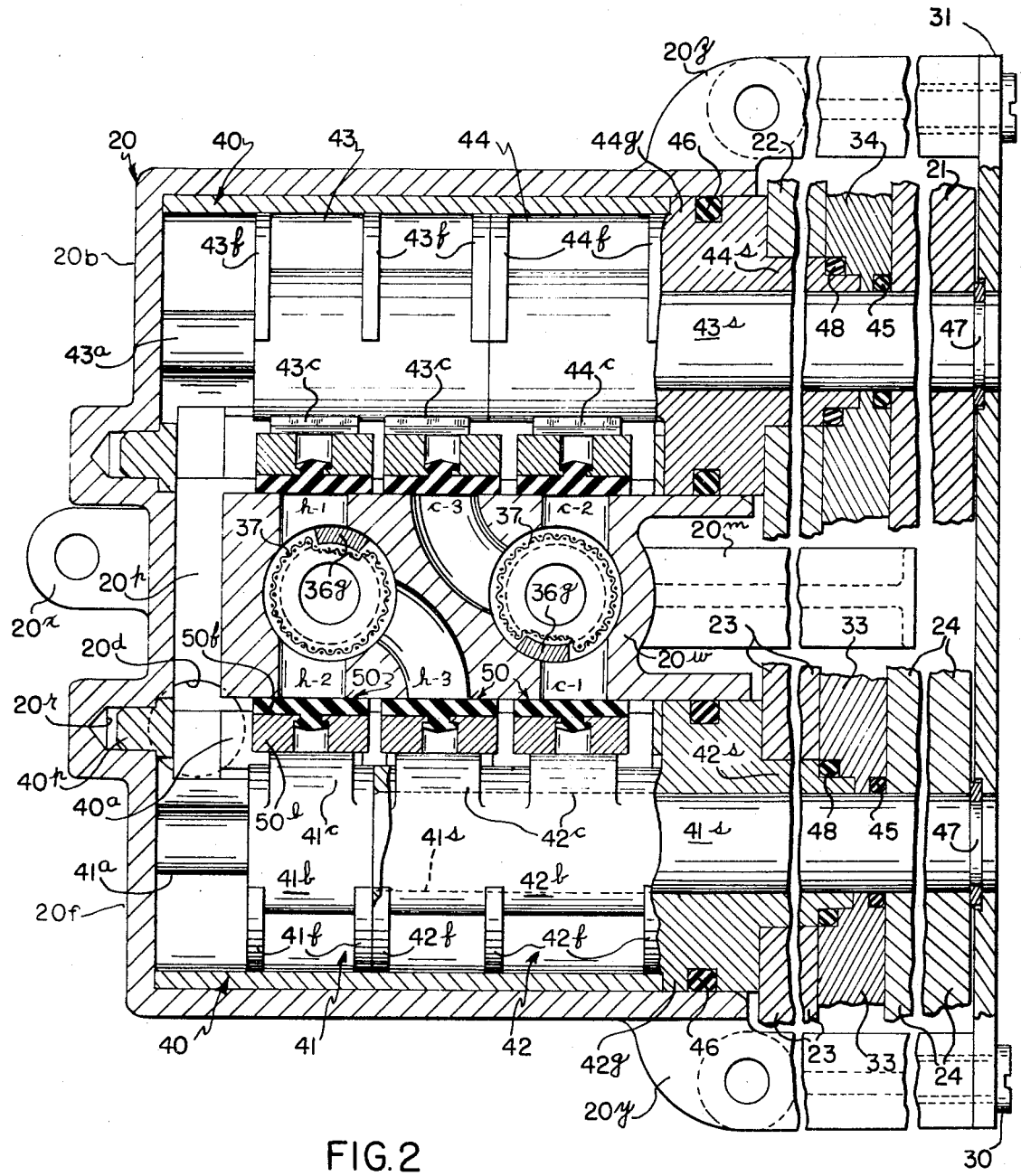
FIG. 2 is a horizontal section through the valve shown in FIG. 1 taken generally at the plane of the valve axis as indicated by the line 2—2 in FIG. 3.

As seen in FIGS. 2 and 5, each vertical inlet bore has at the level of its screen 37 three branch passages formed in the intermediate wall discharging through respective radial valve ports, coplanar in the body horizontal center plane, so that each main chamber has three longitudinally spaced ports opening thereto, provided with respective like valve members 50 and corresponding coaxially stemmed operator pairs 41-42 and 43-44. Thus from the hot water inlet at the left a single port h-1 opens to the back chamber and paired ports h-2, h-3 open to the front chamber; the cold water inlet conversely having a single port c-1 to the front chamber near its right end and paired ports c-2, c-3 opening to the back chamber.

As the internal valving mechanism controlling flow from these ports to outlet 20 d, the connections of the push-buttons 24, 23, 21, 22 respectively to the stems of operators 41, 42, 43, 44, and sealing of these components are generally similar for both barrels or mixing chambers as except where hereinafter noted, only the front half (lower portion in FIGS. 1 and 2) of the valve is considered in detail, (see FIGS. 2, 6, 7); corresponding parts of the operators having like letter suffixes to the respective reference numerals.

A molded nylon sleeve-like or generally hollow cylindrical insert 40 is slotted lengthwise through a segmentally thickened longitudinal portion adjacent the ported intermediate wall, forming a long generally rectangular opening (FIG. 7) between opposite longitudinal margins 40a of which identical cam operated valving elements 50 (see also FIG. 8) spaced to provide flow area therebetween, are radially slidable toward and away from a covering position and sealing contact with the chamber wall over respective water inlet ports. At the inner end of 40, the longitudinal opening is extended into coincidence with the casing discharge outlet passage 20p; an endwise integral pin 40p projecting into a corresponding body end boss recess 20r in the chamber end or bottom wall, for retaining the subassembly of sleeve and valve members in proper orientation to the various casting ports and passages. The valve member structure and further cooperating structure of sleeve 40 are described hereinafter in greater detail.

This sleeve form of valve member support is preferred to an alternative simple longitudinal insert of segmental cross-section, since the latter requires a fastener such as a longitudinal screw or the like holding the frame in proper position in the bore.

In the front chamber, the valving member 50 for the rearmost port h-2 of the paired hot water ports is controlled by a rotational cam operator 41, having an end portion 41a, reduced to provide free axial flow space to the discharge outlet and supported on the chamber end wall; and a stem 41s running coaxially through the hollow second rotational cam operator 42, through the support or pillow block 33, and the "Hot" push-button 24 secured thereon against rotation, to have its outboard end journalled in an appropriate aperture in the retaining plate 31 serving as a joint pillow block for both valving sub-assemblies.

Operator 41 (see FIG. 6) further has, on the stem enlargement or body 41b, a rotary cam face 41c bearing against the recessed back face of the respective valve member 50; and generally opposite the cam formation to give reaction support to the body 41b under camming forces, a pair of reaction support fins 41f, axially spaced endwise slightly beyond the position of cam face 41c, and generally sectorially shaped over about 135° to allow axial flow space. When a cam formation is in the positions show in FIG. 6 and in FIG. 2, its portion of maximum radial dimension is bearing against the flat recess back face of the valve body holding the valve member facing in position against the chamber wall over the controlled port, closing off the latter against the supply pressure. As the cam rotates away from "off" position the decreasing radius permits greater valve displacement under supply pressure increasing the flow area between facing, chamber wall and sleeve ports.

The second cam operating member 42, however, for simultaneously operating the respective valve members for the second of the paired hot water ports h-3 and the single cold water port c-1 to this chamber, has two axially spaced cam faces 42c, 42c, and three support fins 42f, as described for operator 41 on its elongated body 42b; and further has an enlarged flange 42g circumferentially grooved for an O-ring 46 sealing on the chamber bore to form a mixing chamber closure; the "Warm" push-button 23 being fixed on the enlarged hollow projecting stem 42s.

The pillow block 33, so also 34 for like purpose in the back section, on its inward face is double counter-bored (see FIG. 2) to support the reduced outer end of the valve stem 42s projecting beyond push-button 23 and also to form a face groove for O-ring 48 providing a hollow stem to pillow block seal; the outer face having a simple counter-bore receiving the O-ring 45 held captive by Hot push-button 24 for sealing the inner long valve stem 41s to the pillow block 33.

A snap ring 47 in a groove on the elongated stem 41s inward of plate 31 axially secures the push-button 24, pillow block 33, push-button 23, and the two operating members as a sub-assembly, which with plate 31 removed can be simply inserted in or removed from the supporting sleeve and valving member sub-assembly. The positioning of the elements between the shoulder provided by the flange 42g and the snap ring developes the axial force holding the outer components together and compressing the stem sealing O-rings. Notable is avoidance of frictional moving of coaxial stems by each other through direct internal O-ring seals, by sealing rather at the fixed pillow blocks.

In the other or back chamber 20b, the structure of a respective sleeve 40, the valve members 50 and also the means for sealing the operator stems to the chamber and to each other are identical to those above described for the front chamber. However, in the back chamber section 20b, it is the inner operator 43, which carries two cam faces 43c, simultaneously actuating the valve members for the single hot port h-1 and the adjacent one, c-3, of the paired cold ports and has three support fins 43f; while the outer hollow member 44 has merely two fins 44f and a single cam face 44c operating the valve member for the other paired cold port c-2. Since the on-turning rotational directions (clockwise as viewed from right end) are the same as for the first chamber operators, the direction of the cam slopes is the same as those in the first chamber, i.e., as in FIG. 6.

Figure 6:
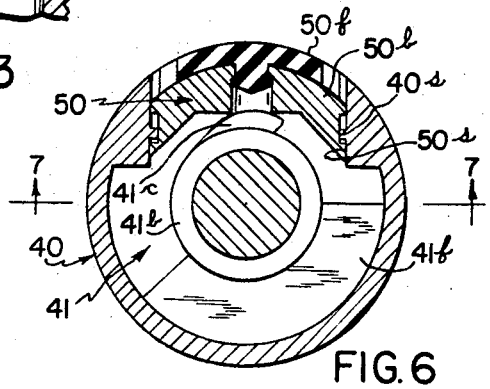
FIG. 6 is an end view of a valving member and supporting frame sleeve sub-assembly, removed from the valve body and having a camming operating stem sub-assembly therein.

As seen in FIGS. 6 and 7, in the top and bottom margins 40 a of the longitudinal sleeve slot there are three pairs of opposed rectangular slots 40b receiving integral rectangular guide ribs 50g on opposite ends of each valve member body or slide block 50b to guide the latter in its sliding reciprocation; and intervening pairs of opposed slots 40c providing additionally to the spacing between valve members 50 further flow area for water leaving the ports.

In the bottom of each guiding slot 40b, a longitudinal recess 40h is interrupted near the middle by a stop formation 40s, interposed between and engageable by the spaced lugs 50s projecting from each guide rib 50g for retaining the valve member 50 in the sleeve opening for simple handling of the sub-assembly. By virtue of flexibility resulting from the preferred plastic material used for the body 50b and also from the body under-cut or sloped portions beneath the back end of the ribs 50g, each valve member 50 may be slid radially inward into or outward from position in the sleeve with the back stop lugs 50s resiliently snapping over the stop projections 40s.

As better seen in FIG. 8, each curved valve member sealing facing 50f is preferably molded of compressibly resilient elastomeric material with a central rearward small integral headed protuberance 50p inserted into, and retentively engaging a counter-bore shoulder of, a central body aperture; whereby it may be manually stripped from or pushed into conforming relation on the body 50b.

The shape of the push-buttons (see FIG. 9) provides two flat dihedral angularly disposed finger contact areas 60, 61 from which and a central hub respectively extend integral arcuate or sector portions 62, 63, terminating in flat end faces 62a, 63a, engageable with adjacent ones of the integral valve body arms 20y, 20z, 20m as stops for the on-off valve actuating motions. These arcuate portions 62, 63 also fill in a slotted area for each push-button in a decorative covering housing, ensuring that at all push-button positions, the valve body casting and other components are concealed from view and the slots closed against entrance of small articles and debris.

TEMPERATURE PRE-SET, SUPPLY SHUT-OFFS, FIG. 5

Details of the mixture proportioning or metering valves 36, screens 37 and shut-off devices 38, identical in both inlet structures, are more clearly seen in FIG. 5, with legends of the cold water inlet. The vertical through-bores of the respective inlets from the top down have two successive counter-bores 65, 66, plain and threaded respectively to receive plugs 36, 38 with the second terminating at a sloping seat shoulder 67. The projecting metering element heads 36a, with circumferential slot 36b engaged by a double U-shaped retaining plate 68 secured by a central screw 69 therethrough threaded into the top of the body casting, are slotted at 36c for screw driver rotational adjustment and are circumferentially grooved for an O-ring 70 sealing to the top bore wall. A narrow vane 36g, carrying a centrally apertured bottom disc-like portion 36f, serves as a metering shutter for one of the associated controlled ports c-1 or h-1, c-1 in FIG. 5 taken at the cold inlet, whereby the flow of water through that port is established by the rotational plug setting.

The bottom section 36f supports the respective generally cylindrical filter screen 37 indented to pass inward of the metering vane 36g and circumferentially confined within a retaining shoulder 36s provided on at least the top portions of plug 36, whereby water flowing in at the bottom aperture in 36f is screened of any debris as it flows radially outwardly towards any of the three associated ports, c-1, c-2, c-3 in FIG. 5.

Shut-off plug 38, beneath its male threaded top 38a engaged in the threaded bore portion 66, is reduced in diameter and radially apertured at several locations 38b to provide flow space from the supply inlet connection through the axial passage 38c to the interior space of screen 37 when its chamfered conical bottom end 38d is withdrawn from seat shoulder 67. Diametric top notches 38h engaged by corresponding lugs 36h depending from metering plug bottom 36f permit 38 to be rotated and move axially as a stop valve for the supply by rotation of the upper plug 36 through several turns, rather than the mere fractional turn rotation involved in setting 36g for water mixture temperature setting.

The manner of valve port closure and sealing, by a simple resilient facing 50f pressing against a chamber wall in a compressed relation with the compressibility of the resilient allowing variation in effective travel of 50, eliminates need of close finish dimensioning and machining of components. Thus the fabrication of the body 20 is simplified for low cost production both in the casting and in subsequent machining operations required; while most of the other principal operating components may be fabricated in final form as molded plastic elements; all readily assembled at a relatively low cost. Thus as to the principal components suitable materials are: for pillow blocks 33, 34, Zytel 122 plastic; for operating elements 41, 42, molded Delrin plastic; for sleeves 40, Nylon; for plugs 38, Nylon; for metering plug members 36, Nylon; valve member slide blocks 50b, molded Zytel 122; for the elastomeric resilient valve facings 50f, rubber or Neoprene; for the body housing shell mold brass casting.

INSTALLATION AND OPERATION

After the valve unit is installed, say on a sink top, and connected to the supply and discharge lines, before placement of such decorative cover as intended to be used, the supply control plugs 36 are rotated by a screw driver or even a coin to back out the respective plugs 38 to full open position; the hot and cold push-buttons are pushed forwardly, simultaneously or successively to run the hot and cold water lines until delivery of hot and cold water at normal operating temperatures, and shut off for similar adjusting operations of the lukewarm and warm delivery temperatures. The adjustments are simply effected by pressing the respective button, and setting the vane 36g relative to its controlled port (h-1 or c-1) by rotation of the corresponding plug 36, aided by appropriately positioned index marks on the plug and the body casting, until a desired delivery temperature is obtained. Then such cover as is desired to be used for the particular environment is screwed in place.

Thereafter in use merely pressing the appropriate push-button forwardly will result in flow of the desired temperature, as soon, of course, as supply water of the contemplated supply temperatures is present at the valve. Pressing the H or C button, in progressively greater degree and rotating the respective cam from full closed position for a correspondingly greater cam recession from the controlled port h-2 or c-2 allows the respective valve member 50 to be displaced further under supply pressure, giving greater flow in consequence of the increased flow area primarily between the valve member face and the mixing chamber wall surface, so that not only temperature but volume of discharge is selectable. Rearward returning finger pressure on the other face of a depressed push-buton moderates or turns off flow.

The operation is similar upon depression or return of the buttons LW and W, except that motion of each affects the position of a corresponding pair of valve members 50 controlling two ports in each chamber; h-1 and c-3 for "luke-warm", and h-3 and c-1 for warm; the water flowing from the ports mixing as it flows through the ample axial flow area provided between the body portions of the operators and sleeve 40 to the discharge passage 20p and outlet 20d.

From the drawing representations and the aforegoing description it is obvious that the unit may be inspected and serviced from one position with only a screw driver or even an appropriately sized coin, by merely removing such decorative cover as is used. Supply line shut off is immediately available by rotation of both plugs 36. Thereupon, by mere removal of screw 69 and plug retaining plate 68 the plugs 36 may be withdrawn for cleaning of the screens 37, and replacement by reversed operations.

With the supply lines thus shut off, mere removal of screws 30 and plate 31 permits withdrawal from one or both chambers of a respective sub-assembly of two operators with associated pillow block and push-buttons, and thereafter of the sub-assembly of a sleeve 40 with its valve members 50. The facing of one or more of the latter are easily removed and replaced by new ones, while in position in the sleeve or as conveniently removed by virtue of the respective shapes, engagements and materials previously described.

MODIFICATION OF VALVING MEMBERS AND SUPPORT — FIGS. 10–11

Figure 10:
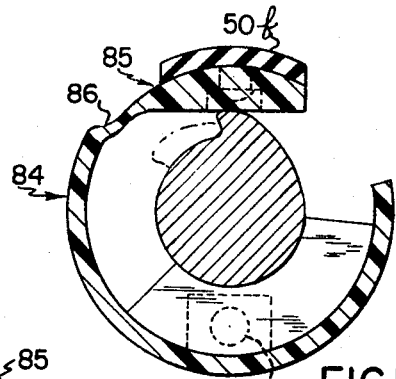
FIGS. 10 and 11 show respective modifications of the valving members and their support sleeve or lattice frame.
Figure 11:
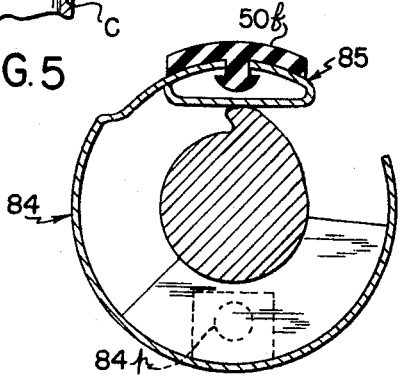

In FIGS. 10 and 11 are shown modifications of the valve member sleeve insert and valve members to an integral structure, of molded Delrin and stainless steel sheet in the respective figures. In each, the sleeve 84 assumes a slightly greater than hollow semi-cylindrical extent with an integral inward radial lug bearing an endwise projecting valve casing engaging pin 84p; and the bodies of the valve members are provided as distinct flap-like portions 85 integrally flexibly hingeably connected to the sleeve, though having separate facings 50f.

In FIG. 10, the valve flaps 85 are somewhat segmental in cross section, and near the region of attachment to the main sleeve portion are thinned to afford a localized hinging line 86. The hinged segments again each have a central shouldered aperture to retain an externally curved replaceable valve facing 50f such as that previously described. The intervening slots defining the valving flaps are appropriately sized to provide, additionally to the area beyond the free ends of the "flaps", flow area from the ports controlled thereby.

The similar arrangement represented in FIG. 11 is fabricated from a stamped and shaped non-corrodible sheet metal, such as stainless steel; the metal being folded behind itself in the flaps to provide requisite thickness of the body.

The modified facing for the valving members shown in FIG. 8A, apart from its circular shape, differs from that previously described only at the contact surface or face which, rather than being merely a portion of a circularly cylindric surface complementary to a body casting bore, is rather molded with a circumferentially continuous rounded bead 50h at the face margin enlosing a generally recessed or relieved face area, and inwardly spaced parallel thereto a further circumferentially continuous formation 50j including an inwardly directed flange or lip, here termed respectively secondary and primary seal formations.

The height of the bead 50h, which tends to make an initial line contact with the bore, and of the transversely relatively extended lip in 50j from the back face of the element are equal but the intervening grove defined therebetween is shallower than the large central recess; and the inner diameter of the lip in 50j is somewhat larger than the diameter of the controlled inlet ports so that it contacts the bore wall at a location spaced slightly from the inlet periphery.

A MODIFICATION OF VALVING MEMBER SEALING FACING FIG. 8B

In FIG. 8B, the valving element facing, in contrast with FIG. 8A, is round, has only the continuous peripheral bead 50h and is centrally apertured and flat backed to be received and be held in the body 50b modified as shown to provide a cylindrical face recess and a central projection through the facing aperture headed over at 50m for facing retention, as by ultrasonic staking for a Zytel body; the bead 50h is even with or projects slightly beyond the body. In the facing modifications of FIGS. 8A and 8B with the limited contact area and smaller volume of elastomer stock therebeneath to be compressed for sealing, for a given elastomer the terminal motion of the push-button operation is achievable with less force exertion, and therefore the shut-off operation is more uniform and easier, than in the case of the solid face form shown in FIG. 8. The overhang of the lip in FIG. 8A provides an undersurface against which water pressure is applied to increase and maintain the seal there obtained; while a similar effect is attained in FIG. 8B by water pressure against the inner periphery of the bead compressing the latter against the surrounding body wall to force the bead outward into firmer sealing contact with the area around the respective port.

ORIENTATION OF CAMS

The orientation of the push-buttons and direction of on-turning finger pressure application desired to be obtained in FIGS. 1-9 dictates the particular orientation of the cam formations and back-up fins or runners in the operating stem members; but, of course, should it be desired that the on-turning directions in front and back sections be in opposite rather than in the same sense, the directions of cam slopes in one section would be reversed from that in the other; and the orientation of the push-buttons would be the same in both sections, rather than opposed as in the view of FIG. 9.

ALTERNATE VALVE MOUNTING: FIGS. 12-13

Figure 12:
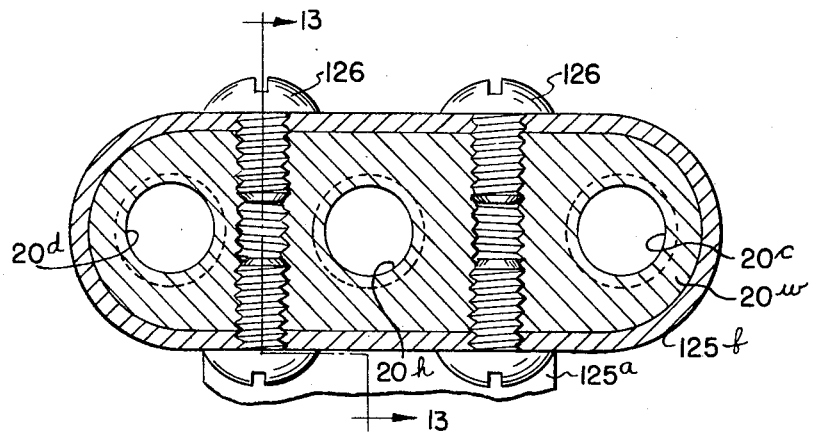
FIGS. 12 and 13 are sectional views representing complementary modifications of the body casting and mount.
Figure 13:
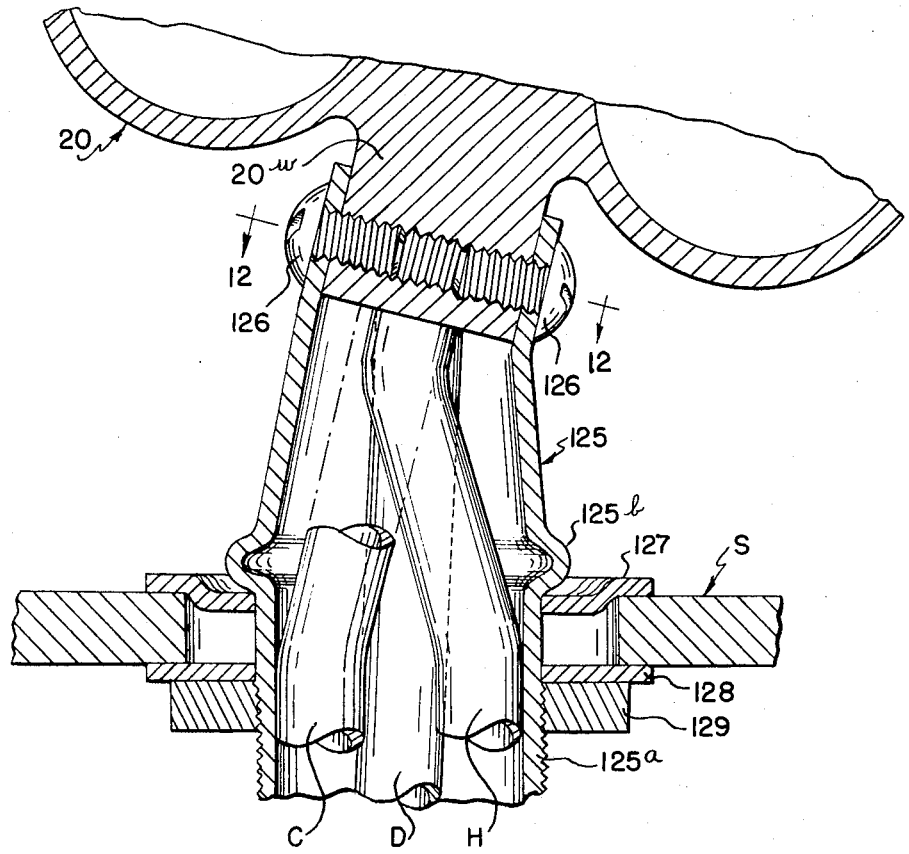

In fragmentary FIGS. 12 and 13 a different form of bracket 125 is shown as means for mounting the valve to a sink top S for example, with a corresponding elimination of lug 20x and apertured thickened portions of 20y, 20z and modification of the bottom portion of the valve body casting 20 from that shown for FIGS. 1-9. The section of FIG. 13 is irregularly taken as indicated approximately by the line 13—13 in FIG. 12.

The discharge outlet 20d is here (see FIG. 12) shifted to a symmetric position coplanar with the cold and hot water inlet connections 20c, 20h and the intermediate wall or web portion 20w of the casting extends downwardly as an elongated, parallel sided, end-rounded flat bottom base extension as a male portion fitted into, and by four screws 126 secured in the complementary shaped female socket-like top portion 125f of the mounting fitting 125. The discharge, hot and cold water piping connections 20d, 20h, 20c are provided by simple counter-bored openings into the flat bottom face, as factory assembly thereto of corresponding tubular supply and discharge pipes H, C and D by brazing is contemplated.

The mounting fitting 125 again has a male threaded tubular portion 125a, extending through an aperture in the sink top and accommodating the piping H, C, D, whereby the whole assembly is clamped to the sink top by use of a downwardly dished top clamping washer 127 engaging a bulged bead 125b, a bottom washer 128, and a clamp nut 129. Such fitting may be fabricated as a casting or preferably from tubular stock by appropriate forming operations flaring the stock outwardly toward the rounded end portions and converging it toward the parallel sides of the described top portion 125f, with upsetting of the bead 125b; chased or rolled threading being used.

FIGS. 14-18 MODIFICATION IN PUSH BUTTON ARRAY & LINKAGES

In FIGS. 14-18 inclusive, for a disposition of the push-buttons in a parallel side-by-side array, essentially only the connection of push-buttons to the operating stems is modified from what has been previously described, though cam slope directions are reversed. Accordingly the internal valving construction need not be again shown; the valve body 20 appears only in fragmentary form; and parts analogous to those previously described are designated by the same or similar reference numerals.

Here the threaded body lugs 20y and 20z, on the front and back chamber barrels 20f and 20b respectively, are not extended to the right in support arms, but along with the integral cast intermediate arm 20m, serve merely as points for attachment by screws 30F of the free arm ends and center of the formed sheet metal, irregularly U-shaped, bracket or frame member 31F, the shape of which may be gathered from FIGS. 14, 15 and 16.

The bracket member 31F affords outboard end support in its axially off-set parallel end portions for the top barrel coaxial operator stems 43s-44s and bottom barrel operator stems 41s-42s; and the parallel, angle-section short top and long bottom arms cooperate with body arm 20m to support stem-sealing pillow blocks 34 and 33 respectively.

The identical push-buttons 21-24, with intervening spacer sleeves 26b, are pivotally supported by a shaft 26s having its ends respectively supported and secured, by shaft-groove engaged snap rings or C-rings 26c, in a vertical integral triangular projection 31t of the bracket, and in an apertured central vertical upright extension 31x of a valve body end cover plate 31P. The latter plate, apertured for respective coaxial stem assemblies extending therethrough, at opposite ends is notched to engage in corresponding notches of the bracket arms for retention against the body open end, thereby also retaining the valve operators and sleeve assemblies in the barrel bores. On the projecting valve operator stems there are secured, as by keying, respective radial lever arms 21a, 22a, 23a and 24a, as hereinafter described, whereby motion of the latter is communicated to the valve stems. The push-buttons and arms are all shown in "off" position in these figures.

In each of the four identical push-buttons as may be seen from FIGS. 14, 16 and 17 the structure is generally symmetrical about a transverse axial plane through the axis of its hub aperture for shaft 26s. Considering push-button 24 as exemplary, a generally broad inverted triangular body portion 24b is widened at the triangle base into an elongated upwardly facing concave finger pressure portion 24c, and at the apertured apical hub region is extended into a thinner integral arcuate fin or partial disk-like portion 24d, concentric with the aperture and carrying on opposed faces a pair of oppositely extending integral round lugs forming a connecting pin 24p. The corresponding arm 24a (see FIG. 18) is end-slotted in two transverse directions, to receive the disk portion in one slot and the pin 24p in the other. Though the pin 24p is angularly off-set from the plane of symmetry, the same push-button form may be used for all, despite the different pin positioning as seen in FIG. 16 by simply turning end for end.

As evident, pushing the back or upper portion of the push-button 24 (and so for all), as viewed in FIG. 16 causing clockwise rotation or translation of the pin 24p, causes also a counter-clockwise swing of the arm and operating stem through the sliding pin and slot connection. Accordingly the cam slope directions on the respective stems would have to be reversed from that shown in FIGS. 2 and 6; or in other words, the slopes would be those appearing in FIG. 19 next described. Also for the button temperature sequence of FIG. 14, where the temperature setting vanes control respective ports as in FIG. 2, the hot and cold water supply connections would be reversed from those of FIG. 2.

FIG. 19 MODIFICATION IN PUSH BUTTON ARRAY; NON-TELESCOPED STEMS

Figure 19:
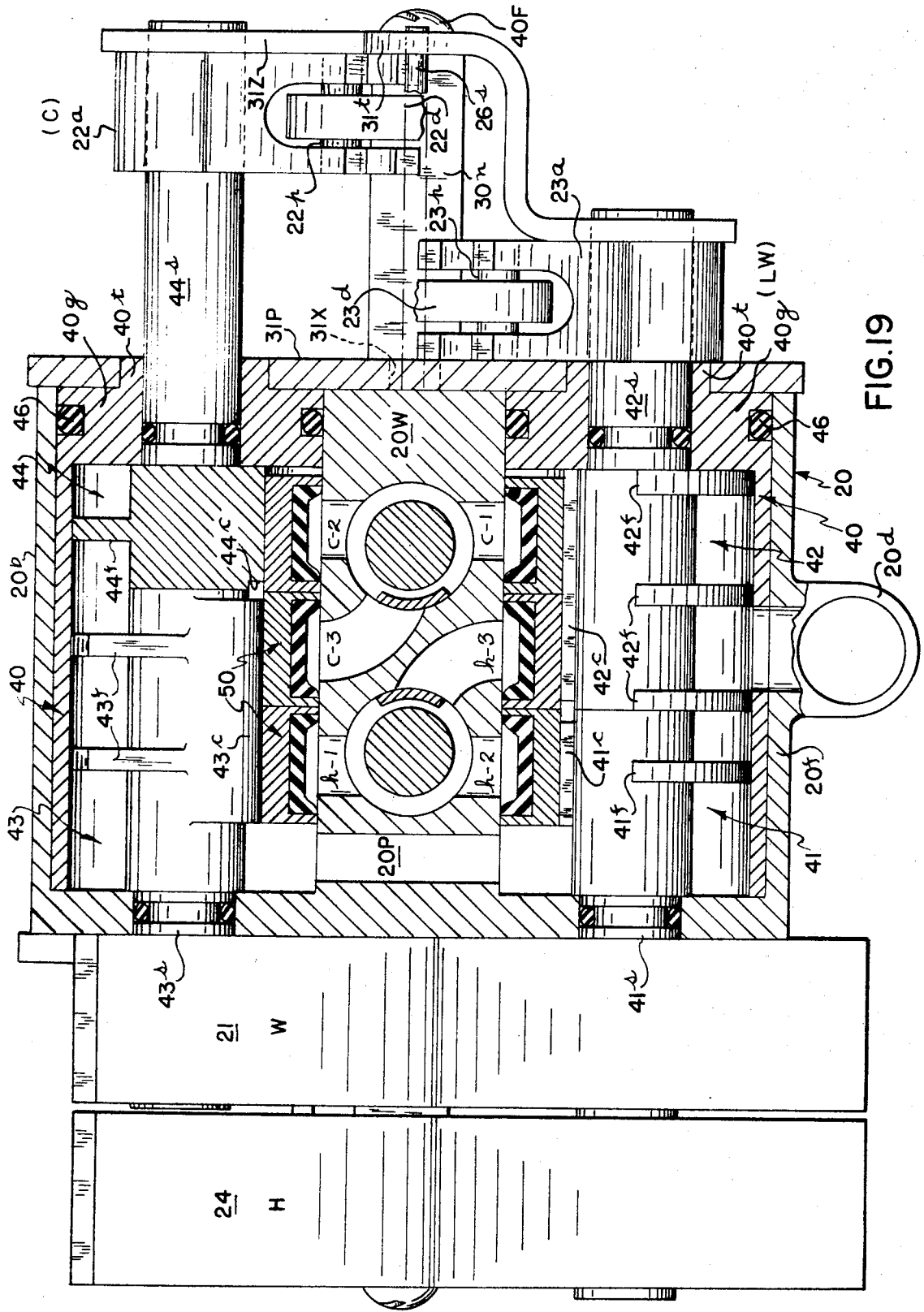
FIG. 19 is a further modifiation of a four-button valve, with pairs of push-buttons at opposite ends of the valve casing shown in partial longitudinal section similar to that of FIG. 2, and utilizing the push-button connection to the operating stems disclosed in FIGS. 14–18.

In FIG. 19 push-button-to-stem connections as just described are again used; but, as the parallel push-buttons occur in side-by-side pairs at opposite ends of the valve body, entailing some modifications of the valve body and operating stems. Here again analogous parts are designated by the same numerals as corresponding parts in prior figures, despite some differences.

In FIG. 19, the left end wall of the valve body casting is bored coaxially with the front and back chambers so that the stems of the innermost operators may extend therethrough with O-ring sealing thereto. Also to accommodate a spout outlet to a sink, the valve body discharge connection 20d is provided near mid-length on the bottom barrel as a projecting formation opening through the barrel wall and an aligned aperture in the valve member supporting sleeve 40; which is possible by virtue of the axial flow paths in the front and back chambers and since the latter are in communication through the intermediate wall passage 20p.

The right end of each valving member supporting sleeve 40 includes, as a barrel closure, a centrally apertured integral disk 40g circumferentially grooved to receive O-ring 46 sealing the same to the bore; the sleeve for the back barrel not requiring the central radial aperture as provided in the bottom sleeve coincident with the discharge outlet. Each end disk 40g has a squared or other non-round projection 40t disposed in a corresponding aperture in an end plate 31P secured as by screws (not shown) across the open right end of the body thereby to retain the sleeves 40 positioned in both axial and rotational sense.

The respective rotary camming operators 41, 42, 43, 44 show some non-essentially different variations from those of FIGS. 1–9 in the location of the reaction or back-up fins 41f–44f inclusive and in the axial extent of the camming surfaces 41c–44c, requiring no discussion; and the directions of the cam slopes in rotational sense are opposite to those in FIG. 2, being precisely of form adapted for the FIGS. 14–18 embodiment. Of greater concern and importance is the fact that the coaxially aligned stem portions in the pairs are not disposed one through the other, but rather are taken out of the chambers in opposite ends, with adjacent end faces of the operators abutting against each other within the chambers. Thus the stems 42s and 44s are taken out through, and by O-rings received in respective stem grooves sealed to, the respective center bores of the sleeve end disks 40g, with the stems 41s and 43s taken out and similarly O-ring sealed through bores in the left end wall of the body casting.

With this arrangement, for each barrel the respective valve member supporting sleeve 40, its three valving members 50 of the form, e.g., of FIG. 8B, and respective two pistons, may be inserted as a sub-assembly into the open end of the barrel from the right, and then properly oriented by turning to receive thereover the plate 31P. Upon securement of plate 31P both axial and angular positioning of the internal components is assured; the respective shoulders defined by the cam-bearing enlargements on the stems 43s and 41s bearing against the body left end wall and the end abutment with the respective paired operators positioning the inner operators.

The paired push-buttons, at the left end of FIG. 19 appear in plan, but at the right are broken away to show an apertured Z-plate stamping 31Z secured to the body casting by a bolt or machine screw 30F extending through a spacer sleeve 30m (as an alternative to the prior appearing integral casting arm 20m), providing outboard end support for the ends of the operator stems 42s and 44s, bearing respective lever or operating arms 23a and 22a. The push-buttons, their shaft support except that only two push-buttons with a spacer are supported on each of aligned shafts, and the lever arms are similar to those described for FIGS. 14–18 in their form and mode of engagement, as indicated in fragmentary fashion at the right side of FIG. 19 by the disk portions 23d, 22d and pin portions 23p, 22p of Luke Warm and Cold push-buttons shown engaged in arms 23a and 22a; and the short shaft 26s with opposite ends supported and secured in apertured vertical extensions 31t and 31x of the plates 31Z and 31P, with a similar arrangement at the left.

FIGS. 20–26, OVERALL MODIFICATION WITH ROTARY CAMS

In FIGS. 20–26 inclusive appears a still further embodiment of the invention utilizing rotary type cams and, as in FIG. 19, avoiding stems passed coaxially through one another. This form is particularly adaptable and useful where a very compact arrangement is desired of all four push-buttons in a side-by-side array since the push-buttons, as in FIG. 14 mounted on a common shaft 26s, may be supported over, and in a longitudinal center plane of, the body casting (see FIG. 21), as will be apparent from the structure hereinafter described.

The general arrangement of the body casting 20 with the open barrel ends at its opposite ends and the other components are seen in FIGS. 20 and 21 to be symmetrical with two-fold rotational symmetry about an axis through the discharge outlet 20d and vertical to the plane of FIG. 20. The body casting here has the piping connecting formations for the central discharge outlet 20d, the cold water inlet 20c and hot water inlet 20h aptly located in a central downward extension of the intermediate wall 20w, as shown in FIG. 13 for support in the environment of use by a suitable mounting means.

Here in effect the front and back barrels are each interrupted by a respective opening for an actuating lever arm 23a, or 21a as hereinafter described, to define aligned spaced left and right hand portions 20fl and 20fr for the front or bottom barrel, and 20bl and 20br for the top barrel; and, in the broad intermediate wall 20w, a large discharge chamber or passage 20p, into which open each of four radial discharge ports "d" of the respective barrel portions, puts the latter into communication with the discharge outlet 20d.

The cold water inlet 20c through a passage opening through a tapered seat 67 communicates with the inward end of a cold water supply shut-off bore threaded at 66 to receive a threaded shut-off plug 38 with tapered inner end 38d cooperating with the seat; and thence through a vertical radial port 38c into a parallel bore 20cc serving as a cold water screening and metering chamber. The outer enlarged portion of plug 38, grooved for an O-ring sealing to the outer unthreaded counter-bored portion of the shut-off bore, terminates in a slotted end 38h, accessible for screw driver engagement through corresponding aperture in the respective retaining plate 68 secured to the casting end by screws 69.

The chamber 20cc, bored endwise into the intermediate wall parallel to the cold shut-off bore, has three outlet ports, namely, radial port c-1 to barrel portion 20fr, and the radial port c-2 and eccentric bottom port or passage c-3, both opening radially to barrel portion 20br. A similar hot water supply shut-off valve and valve chamber is provided on the left between hot water supply inlet 20h and hot water screen chamber 20hc similarly opening through radial port h-1 to barrel portion 20bl, and through radial and eccentric bottom ports h-2, h-3 radially to barrel portion 20fl.

The identical water screening and metering devices, (not shown at the right in FIG. 20 in 20cc) represented by the assembly in chamber 20hc, are inserted endwise in and retained in their chambers by the respective end plates 68. As shown at the left of FIG. 20, such device is comprised of an outer plug 36 with reduced slotted end 36c projecting through an aperture in its retaining plate 68 and O-ring sealed to the chamber bore; and, by a longitudinal, somewhat eccentric connecting bar, supporting an inner end disk 36g having a screened eccentric aperture cooperating with the chamber end port, h-3 for the hot water chamber 20hc (or c-3 for the cold water chamber 20cc), to set the flow permitted through such ports for pre-setting the luke-warm and warm temperatures available. The assembly further supports between the end plug and bottom disk a cylindrical inlet filtering screen 37 fitting against the chamber bore, but having an arcuate partial circumferential slot or cut-out to allow water to enter unscreened into the debris collecting interior of the screen cylinder for screening upon outward flow through the screen 37 and through the screened aperture of the end disk 36g.

In the front and back barrels, the respective single insert sleeve 40A, the shape of which may be gathered from FIGS. 24, 25 and 26, supports the three identical FIG. 8B type valving members 50 engaged in slideways, not here to be described in detail since similar to those previously described relative to FIG. 7, despite the differences in the general external sleeve structure.

Considering now the back structures as exemplary for both barrels, in a central cylindrical bore of the valving member supporting sleeve 40A are received and journalled the generally cylindrical cam enlargements 43b—43b and 44b of the two endwise abutting double and single rotary cam type operators 43 and 44, with lever arms 21a and 22a affixed to their stem portions 43s and 44s. On either side of the valve stem 43s, the like cam enlargements 43b are O-ring sealed to the sleeve bore; while the reduced diameter stem 44s extends through and is O-ring sealed through the central aperture of the sleeve end closing disk portion 40g, in turn sealed by O-ring 46 in its external circumferential groove just within the open right end of the bore in back barrel portion 20br. An inwardly spaced cut-out narrow reduced diameter portion 40m of the sleeve is similarly grooved and sealed, on the right side of the arm-accommodating cut-outs, to a correspondingly reduced diameter of the bore beginning at the left end of barrel portion 20br and carried behind the cut-outs; while the remaining innermost cylindrical end portion of the sleeve, somewhat further reduced to the bore diameter of 20bl is similarly O-ring sealed to the latter at 40n. These successive reductions in the external diameters of the sleeve and internal diameters of the barrel bore facilitate sleeve insertion without damage to the O-rings.

Between the intermediate diameter mid portion 40m and the seal region 40n (see also FIG. 23), the sleeve is cut out coincidently with the cut-out in the barrel wall for the lever arm 21a rectangularly notched to fit on, and bolted to the correspondingly flatted stem 43s; but arm 22a (see FIG. 21) has an aperture keyed to stem 44s. The outboard ends of the operators 41s and 44s are also rotatably supported in the respective plates 68. Note, however, FIG. 23 is taken on the front barrel.

On each side of the "windows" or slideways receiving the adjacent valve members 50, 50, the sleeve is externally circumferentially grooved in varying width at three places, these grooves being joined by external longitudinal grooves diametrically opposite the valving member slideways to form between the sleeve and bore wall of 20br ample water flow passages from cold water ports c-2, c-3 to the associated discharge port d (see FIGS. 20, 24, 25); but inward of the innermost seal portion 40n and meeting the window for the isolated valve member 50, a flatted portion forms a slot or flow space from the port h-1 to the adjacent radial port d into the large central chamber or passage 20p.

The camming formations here result by merely making localized flats on the respective operator cylindrical enlarged portions (as flat 44c on 44b, see FIG. 22) leaving extensive full cylinder regions rotatably journalled and supported within the sleeve main bore. Thus progressive advancement of the flat area 44c, from the "closed" position shown in FIG. 22, behind the associated valve member 50 allows its recession from sealed position in relation to the controlled port c-2, and hence increased flow.

Though the actuating arms 22a and 24a more closely approximate that of FIG. 18, they and also arms 21a and 23a have, as in FIG. 18, the perpendicularly doubly-slotted forked ends to accommodate the disk portion and pin of identical push-buttons, as represented in FIG. 21 by disk 22d and pin 22p of a fragmentary shown push-button, engaged in arm 22a.

FIG. 20 though in section, considered with FIGS. 21 and 23, shows in plan the locations of the operating arms, by the positions of their respective stem portions 41s, 43s, 42s, 44s, as in successively like axially off-set spacings; so that with the arms of 41 and 42 inclined upwardly, those of 43 and 44 inclined downwardly, in their off positions (shown in FIGS. 21 and 23), a quite compactly arranged set of push-buttons, of the general form and shape as described with respect to FIGS. 14–18, may be parallel-mounted with suitable intervening spacers on a single shaft disposed above the valve body casting and supported in a center plane vertical and parallel to the axes of the barrels, as shaft 26s with ends supported in vertical extensions 68t of the end plates 68.

The operation should be obvious from the drawings and the operative description given for previously discussed embodiments.

FIG. 27 — RECIPROCATING CAMS IN FIG. 1 TYPE BODY

In FIG. 27, a fragmentary outline shows as though in the back mixing chamber of the body in FIGS. 1–4, a modification of the operators entailing also a minor modification in the respective valve members accommodated thereto. The sleeve 40 and the individual valve members 50 supported thereby may have any one of the forms described for FIGS. 1–11, but as shown are essentially those of the valve in FIGS. 1–9. However, the individual valving members 50, rather than having a generally flat back face for contact by the cams, here are curved in a direction longitudinally of the bore.

The operators 93, 94 in FIG. 27 are axially shifting cam members, the outermost hollow operating member 94 having a single valve member camming surface 94c comprising a sloped or conically tapered portion and a straight or cylindrical portion cooperating with the curved back of its respective valve member. The cam portion of the operator is again backed by reaction support vanes or fins 94f bearing on the liner sleeve 40 on the side more or less diametric from the controlled port region. The other operator 93, with stem extending coaxially through the first and inner end 93a supported in a corresponding central bore 20n in the end wall of the chamber with sufficient clearance for the axial shifting, has two such cam surfaces 93c and corresponding sectorial support fins or vanes 93f.

Although the operators could be moved by direct push-pull manual operation, for this purpose there is shown a push-button set similar to that previously disclosed, with a push-button on each projecting stem end. However, each stem has a steeply sloped thread-like camming groove 93t on the projecting stem 93s and groove 94t on the thickened flange 94g for example, with one-half thread per inch lead, engaged by a corresponding pin 95, 96 in an axially fixed element, namely in the pillow block 34 and in the valve casing. The push-buttons have either a key and slot connection with the respective stems, or have square holes receiving squared stem ends 93x, 94x as shown for rotating yet permitting axial shift of the stems.

Accordingly when a push-button is pressed and therefore rotated in one or the other direction, by virtue of the described threaded groove-pin engagement of the corresponding stem, the stem is moved axially in or out, camming the respective valve member or members closed or permitting opening. Axial stem clearance is, of course, provided by recessing the inner faces of the push-buttons 22, 21 for the O-ring flange formation 94g and for the shoulder appearing where the squared portion of the inner operator begins. Here the sealing between the coaxial stems is obtained by an O-ring 98 in a groove of stem 93s. The outer face of push-button 21 is also recessed to accommodate the snap ring 97 in a groove between the outer end of the squared portion and the reduced cylindrical terminal portion of 93s.

Left hand threads are used for disposition of the push-buttons in the array similar to that shown in FIG. 1, where the back face of the push-button is pressed forwardly to open the valve.

FIGS. 28–30: SINGLE-BARREL, CONTINUOUS TEMPERATURE VARIATION VALVE

In FIGS. 28, 29 and 30 there is shown an embodiment of the basic invention wherein the push-button actuation is assumed by a single larger handle or knob 145, for a stem 141 which is both reciprocable for off-on and flow volume control and rotatable to determine the temperature of the water.

In this case the valve body 120 has hot and cold water supply inlet connections 120h, 120c communicating through passages opening as diametrically opposed radial ports h and c into a vertical tubular mixing chamber in turn discharging to a suitable discharge connection 120d of the casing through a radial outlet port 120p, disposed coplanar with and at right angles to the controlled ports.

Here a composite liner or valve member supporting sleeve structure is provided by two identically shaped approximately semi-cylindrical longitudinally abutting like halves 140, 140 each a valve member support having but a single opening slidably mounting, for movement to and from a respective port, a corresponding valve member 150. To provide an opening to the discharge passage 120p both edges of each support 140 are recessed or notched so that they may be identical and further to obviate need of assembling in a particular orientation in the casing.

Each valve member 150 is generally identical to the valve members 50 in the valve unit of FIGS. 1–9, in its overall shape and manner of engagement with its respective half-sleeve, also as to sleeve and valve member clearances for water flow. However, the back face of each valve member has two sloping surfaces converging to a dihedral edge represented by the vertical line 150a in FIG. 29 for accommodation to the rotatable and reciprocable valve operating stem 141, hereinafter described, extending coaxial with the mixing chamber bore and the composite sleeve formed by the two valve member supports.

Stem 141 is supported at its inner end 141a in a central, plastic-bushing-lined recess 120b in the body casting bottom wall and near its upper end by a circumferentially grooved flange 141b slidably sealed on the bore of the tubular housing by an O-ring 144 as the primary sealing closure of the valve body. Beneath stem flange 141b an axially extended cylindrical enlargement 141d is movable in a tubular guide socket or recess jointly formed by the upper ends of the cooperating supports 140; opposed flanges 140f supporting the stem center.

An intermediate stem portion affords a rotationally and axially acting cam formation 141c which, with the stem in innermost position as shown in solid lines, presents to the valve members 150 a coaxial cylindrical surface, therefore a maximum cam diameter, irrespective of rotational position of the stem, thereby to hold both of the diametrically opposed valve members 150 displaced outwardly against the chamber wall over and closing off the respective ports $c$ and $h$. However, between the slidably journalled inner end 141a and the full diameter of the cylindrical cam portion, the valve stem is eccentrically tapered (see also FIG. 40) with a narrow portion of the taper at 141cs a continuation of the cylindrical cam surface.

Thus by axial withdrawal of the stem, maintained in the rotational or angular position shown in FIGS. 28–29, from the axial position in solid lines to the dashed line position shown in FIG. 28, both valve members open by inward displacement under supply pressure to allow equal water flow into the mixing chamber from both ports with the volume dependent upon the extent of the axial withdrawal of the stem; while at any rotational or angular positioning of the stem other than as shown or extreme positions 90° thereto, mixed flow, of unequal selectable proportions ensues in total volume dependent upon the extent of axial withdrawal. When the continuation 141cs in the taper portion of the cylindrical cam surface is turned at a respective extreme towards one of the valve members, since withdrawal of the valve stem does not permit that valve member to open, flow results only by the allowed displacement of the other valve member; so that in either of the diametrically opposite 180° positions, full hot or full cold water temperature is obtained with volume dependent upon stem withdrawal.

As a manual actuator, a knob 145 with bale-like integral handle 145h has a hemispherical base portion seated and rotatably supported on the concave upper surface of a cap 146 slotted for an integral lug or a plate 147 projecing therethrough from the base into the close embrace of spaced upward integral stem top ears 141g through which passes a pin 148 engaged in the sloped camming slot 147c of plate 147.

The upper end of the housing tube embraced by the skirt of cap 146 is circumferentially grooved for cap-retaining dog point set screws 149 threaded through the skirt, permitting rotation of but inhibiting axial shifting of the cap and hence operator handle 145. Hence two types of motion are possible as indicated by the curved arrows in FIG. 28.

Thus by grasping of the handle and rotation thereof about the vertical axis of the stem and housing, the rotational position of the stem is changed, thereby to change the proportioning of the water flow obtained from the inlet ports upon valve opening; looking at the assembly from above, clockwise rotation providing an increasingly cold mixture, counter-clockwise rotation an increasingly hot mixture for the port locations shown.

On the other hand, rotation of the operator or handle about a horizontal axis perpendicular to the plane, extended, of plate 147, i.e., on axis parallel to pin 148, causes axial shift of the stem, for on-off volume control; clockwise rotation, as viewed in FIG. 28 increasing the flow, counter-clockwise decreasing and turning off flow.

I claim:
1. A valving structure comprising:
a valve body having a main bore with a discharge port and a plurality of inlet ports opening into said bore through the cylindrical interior wall surface thereof,
valving members for the respective said inlet ports each with a resilient inlet port sealing front face,
a valving member supporting frame means in the bore,
having a respective aperture in which each said member is moveable toward and away from inlet closing sealing contact with the bore wall,
and shaped to provide flow space from said inlet ports to said discharge port of the bore when said valving members are moved away from such sealing contact,
valve operating rotatable stem means extending lengthwise into said bore moveable between a full open and a full closed position and
carrying rotational cam means contacting the respective backs of said valving members and shaped to move the valving members radially to positions ranging from a maximum excursion from, and to a sealing contact with, the respective inlet port region of the bore wall.
and stem seal means moveably sealing said stem means to the body; said frame means axially removable and insertable in and secured against shifting in the bore.

2. A valving structure as described in claim 1, wherein
said valving members and frame means are provided by a generally cylindrical sleeve fitted in said bore and therein anchored against rotational shifting
and having for each respective valving member an integral portion freed about its major periphery from and offset relative to the surrounding sleeve portions to define a flap-like structure as a valving member body,
said resilient face for each valving member provided by a resilient elastomeric element attached to a respective said valving member body.

3. A valving structure as described in claim 1, wherein:
said body has three inlet ports axially spaced along the bore and at least two discharge ports communicating with a common outlet,
one said outlet port associated with one inlet port near the bottom of the bore,
a second said outlet port associated with the two other inlet ports near the open end of the bore,
and said body has a lateral bore wall opening axially located between the first and second outlet ports with associated inlet ports;
said frame means comprises as a one-piece structure, a relatively thick sleeve closed at one end by a centrally apertured disk-like portion and open at the other end, and having a lateral opening coincident with the lateral opening through the bore wall,
said sleeve having, as apertures for said members, radial slideway formations centered relative to respective inlet ports,
said sleeve having in external cylindrical portions flow spaces from the regions adjacent the valving member bodies to said outlet ports,
said sleeve circumferentially O-ring sealed to the bore at the open end of the bore, and at locations adjacent said lateral openings,
said valving members each comprising a rigid valving member body and a resilient elastomeric element secured to the member body as said face, said valving member bodies slideably engaged in respective said slideway formations, said valve operating stem means comprising a first and a second valve stem providing generally cylindrical enlargements of like cam sections journalled in said sleeve and interrupted by rotary cam formations as said cam means, the first valve stem having a single said enlargement with cam formation contacting the valve member for the inlet port nearest the open end of the bore and including a shaft-like projecting portion through the aperture of the disk-like portion, the second valve stem comprising two said enlargements and an intervening mid-portion coincident in axial position with said lateral openings, the cam formations of the last said enlargements respectively contacting the valve members for the port nearest the bore bottom and for the innermost of the other said two inlet ports;

said mid-portion having a cross-section smaller than that of the sleeve interior, said stem seal means comprising, the first valve stem projecting portion rotatably sealed in the disk-portion aperture and the disk portion sealed to the bore, and the second valve stem rotatably sealed to the interior of said sleeve at axial locations on each side of said lateral openings, and push-button actuated lever arms on said projecting portion and mid-portion of the stems.

4. The valving structure as described in claim 3, wherein:

said operating stems are axially positioned and held in endwise abutment by a shouldered engagement of the first with the inner face of said disk portion and by endwise engagement of the second with said bottom wall;

an end plate, secured in spaced relation to the bore opening supporting an outboard end of the projecting stem portion with the corresponding lever arm bearing against the disk-portion, retains said frame bottomed in the bore;

and including means securing said frame against rotation.

5. The valving structure as described in claim 4, wherein:

said frame sleeve is circumferentially grooved for O-rings providing the sealing to the bore on opposite sides of the body lateral opening; and the portion of the bore adjacent the side of the body lateral opening toward the bore mouth has a first reduction in diameter, and inward of the lateral openings a further reduction in diameter, whereby introduction of the frame-sleeve into the bore without damage to the O-rings is facilitated.

6. A valving structure as described in claim 1, wherein at least two said inlet ports and respective valving members are diametrically opposed to each other in the bore, said stem means reciprocable coaxially in the said bore and carrying as said cam means a cam formation reciprocable between and in contacting relation with the backs of the opposed valving members, said formation comprising a cylindrical portion for holding the valving members closed and a tapered portion permitting the said members to open with axial movement of the stem;

said stem having an enlargement circumferentially sealed to the bore between an open end of the bore and said inlet ports.

7. A valving structure as described in claim 6, wherein said frame means comprises for each diametrically opposed valving member a segment of a cylinder having a radial slideway formation centered relative to a respective inlet port, said valving members comprising a rigid valving member body and a resilient elastomeric element secured to the body as said face, said valving member bodies slideably engaged in respective said slideway formations, each said segment having flow spaces therethrough around the valving member bodies.

8. A valving structure as described in claim 7, wherein said segments are provided by like hollow semi-cylindrical elements jointly forming in said main bore a sleeve-like fitted insert.

9. A valve structure as described in claim 1, said stem means including two stems carrying respective said cam means cooperating with respective said valving members;

said body having an auxiliary bore communicating with one of said inlet ports by a first passage opening radially into the auxiliary bore and communicating with a fluid supply connection by a second passage opening into its inner end; and plug means closing and rotatably sealed and secured in the outer end of the auxiliary bore, said plug means having a portion adapted to close off said first passage for varying flow therethrough by rotation of said plug means.

10. A valving structure as described in claim 9, wherein said second passage opens axially through the bottom end of the auxiliary bore through a valve seat formation; and with said plug means including a portion threadedly engaged in the auxiliary bore and hving its inner end adapted to engage said seat to shut off the fluid supply upon rotation-induced axial advance of the last said portion.

11. A valving structure as described in claim 9, wherein said auxiliary bore includes a threaded counterbore extension with a valve seat at its inner end and said second passage opens through said valve seat into the auxiliary bore;

said plug means comprising an inner plug threadedly engaged in the counterbore to shut off the fluid supply upon rotation-induced axial advance of said inner plug, said inner plug having a fluid passage from its outer end opening radially between its inner end and locus of threaded engagement, said plug means further comprising an outer plug rotatably sealed and secured against axial shift in the outer end of the auxiliary bore, and at its inner end having a tongue and slot engagement with said inner plug for rotating and axially moving the inner plug and, the second plug having a fluid passage axially entering its inner end and opening radially over the major extent of its circumference on either side of said portion at the level of said first passage.

* * * * *